United States Patent
Trifonov et al.

(10) Patent No.: US 6,826,310 B2
(45) Date of Patent: Nov. 30, 2004

(54) AUTOMATIC CONTRAST ENHANCEMENT

(75) Inventors: Mikhail Ivanovich Trifonov, Leningrad Region (RU); Olga Vadimovna Sharonova, Saint Petersburg (RU); Kryzstof Antoni Zaklika, Saint Paul, MN (US)

(73) Assignee: Jasc Software, Inc., Eden Prairie, MN (US)

( * ) Notice: Subject to any disclaimer, the term of this patent is extended or adjusted under 35 U.S.C. 154(b) by 677 days.

(21) Appl. No.: 09/900,744

(22) Filed: Jul. 6, 2001

(65) Prior Publication Data

US 2003/0053690 A1 Mar. 20, 2003

(51) Int. Cl.[7] .............................. G06K 9/40; G06K 9/00
(52) U.S. Cl. ...................................... 382/274; 382/168
(58) Field of Search ................................ 382/162, 168, 382/169, 170, 172, 270, 254, 274, 276, 277; 358/447, 509, 518, 519, 520, 522, 530; 348/672, 678; 345/589, 590

(56) References Cited

U.S. PATENT DOCUMENTS

| | | | | |
|---|---|---|---|---|
| 4,654,722 A | | 3/1987 | Alkofer | 358/284 |
| 4,731,671 A | | 3/1988 | Alkofer | 358/284 |
| 4,999,711 A | | 3/1991 | Paulin | 358/169 |
| 5,265,200 A | | 11/1993 | Edgar | 395/131 |
| 5,347,374 A | | 9/1994 | Fuss et al. | 358/522 |
| 5,363,209 A | * | 11/1994 | Eschbach et al. | 358/445 |
| 5,396,300 A | | 3/1995 | Kageyama | 348/678 |
| 5,414,538 A | | 5/1995 | Eschbach | 358/522 |
| 5,426,517 A | | 6/1995 | Schwartz | 358/520 |
| 5,450,502 A | | 9/1995 | Eschbach et al. | 382/169 |
| 5,581,370 A | | 12/1996 | Fuss et al. | 358/447 |
| 5,712,930 A | | 1/1998 | Watanabe | 382/270 |
| 5,724,456 A | * | 3/1998 | Boyack et al. | 382/274 |
| 5,748,802 A | * | 5/1998 | Winkelman | 382/271 |
| 5,802,214 A | * | 9/1998 | Eschbach et al. | 382/254 |
| 5,808,697 A | * | 9/1998 | Fujimura et al. | 348/672 |
| 5,812,286 A | | 9/1998 | Lin | 358/519 |
| 5,870,505 A | * | 2/1999 | Wober et al. | 382/274 |
| 5,883,984 A | | 3/1999 | Huang et al. | 382/274 |
| 5,926,562 A | | 7/1999 | Hyodo et al. | 382/167 |
| 5,937,090 A | | 8/1999 | Kim | 382/169 |
| 6,148,103 A | | 11/2000 | Nenonen | 382/169 |
| 6,473,535 B1 | * | 10/2002 | Takaoka | 382/274 |
| 6,628,830 B1 | * | 9/2003 | Yamazoe et al. | 382/168 |
| 6,664,973 B1 | * | 12/2003 | Iwamoto et al. | 345/589 |
| 6,694,051 B1 | * | 2/2004 | Yamazoe et al. | 382/167 |

FOREIGN PATENT DOCUMENTS

| | | | |
|---|---|---|---|
| JP | 5-176220 | 7/1993 | H04N/5/235 |
| JP | 9-149277 | 6/1997 | H04N/1/60 |
| WO | WO 97/01151 | 1/1997 | G06T/5/00 |

OTHER PUBLICATIONS

J. A. Stark, et al., "An Alternative Algorithm for Adaptive Histogram Equalization," *Graphical Models and Image Processing* vol. 58(2) Mar. 1996; 180–185.

(List continued on next page.)

*Primary Examiner*—Andrew W. Johns
*Assistant Examiner*—Amir Alavi
(74) *Attorney, Agent, or Firm*—Hensley Kim & Edgington, LLC

(57) ABSTRACT

A method of automatic contrast correction comprises providing digital image data, representing the data in the form of a brightness histogram, determining a measure of central tendency for said histogram, adding a shift value to the measure of central tendency to provide an adjusted measure of central tendency, using the both the determined and adjusted measures of central tendency to determine the exponent of a tone reproduction curve, and applying the tone reproduction curve to the brightness values of the image. Additionally, the method may provide further correction by applying to the brightness values of the image an S-shaped tone reproduction curve that does not change a measure of central tendency of the brightness histogram.

30 Claims, 4 Drawing Sheets

OTHER PUBLICATIONS

Y. T. Kim, "Mean Based Bi–Histogram Equalization: A Novel Extension of Histogram Equalization Preserving Brightness," *Proceedings of the LASTED International Conference Signal and Image Processing* vol. 251(114) Nov. 11–14, 1996: 310–314.

R. Humel, "Image Enhancement by Histogram Transformation," *Computer Graphics and Image Processing* vol. 6, 1977; 184–195.

W. Frei, "Image Enhancement by Histogram Hyperbolization," *Computer Graphics and Image Processing* vol. 6, 1977; 286–294.

A. Mokrane, "A New Image Contrast Enhancement Technique Based on a Contrast Discrimination Model," *Graphical Models and Image Processing* vol. 54(2) Mar. 1992; 171–180.

V. F. Nesteruk, "Optimum Nonlinear Contrast Statistical Image Converter and an Evaluation of its Efficiency," *Sov. J. Opt. Tech.* vol. 48(11) Nov. 1981; 647–650.

V. F. Nesteruk, et al., "Contrast Law of Light Perception," *Optics and Spectroscopy* vol. 29, Feb. 27, 1970; 606–609.

G. J. Braun, et al., "Image Lightness Rescaling Using Sigmoidal Contrast Enhancement Functions," *Journal of Electronic Imaging,* vol. 8(4) Oct. 1999; 380–393.

Y. Nayatani, "Revision of the Chroma and Hue Scales of a Nonlinear Color–Appearance Model," *Color Res. And Appl.,* vol. 20(3) Jun. 1995; 143–155.

R. W. G. Hunt, "An Improved Predictor of Colourfulness in a Model of Colour Vision," *Color Res. And Appl.,* vol. 19(1) Feb. 1994; 23–26.

M. R. Luo, "The LLAB Model for Colour Appearance and Colour Difference Evaluation," *SPIE,* vol. 2658, 1996; 261–269.

M. D. Fairchild, "Refinement of the RLAB Color Space," *Color Res. And Appl.* vol. 21(5) Oct. 1996; 338–346.

M. D. Fairchild, "A Revision of CIECAM97s for Practical Applications," *Proceedings of the CIE Expert Symposium '97 on Colour Standards for Image Technology, CIE Pub. X014,* 1998; 1–32.

F. Ebner, et al., "Development and Testing of a Color Space (IPT) with Improved Hue Uniformity," *Proc. 6th IS& T/SID Color Imaging Conf.* 1998; 8–13.

S. L. Guth, "Further Applications of the ATD model for Color Vision," *SPIE* vol. 2414, 1998; 12–26.

The CIE 1997 Interim Colour Appearance Model (Simple Version), CIECAM97s, *CIE Publ.* Apr. 1998; 1–21.

X. Zhang, et al., "A Spatial Extension of CIELAB for Digital Color–Image Reproduction," *Journal of the Soc. Information Display,* vol. 5(1) 1997; 61–63.

R. S. Berns, et al., "Determination of Constant Hue Loci for a CRT Gamut and Their Predictions Using Color Appearance Spaces," *Color Res. And Appl.* vol. 21 (2) Apr. 1996; 163.

D. L. MacAdam, "Uniform Color Scales," *J. Opt. Soc. Am.,* vol. 64(12) Dec. 1974; 1691–1702.

"The NCS is as Simple as This!" http://www.ncscolour.com/engelsk/pages/ncs_sys1.htm, 1989; 1–2.

M. Richter, et al., "The Story of the DIN Color System," *Color Res. And Appl.,* vol. 11(2), Summer 1996; 138–145.

A. R. Smith, "Color Gamut Transform Pairs," *Comput. Graphics* vol. 12, 1978; 1–19.

T. H. Yu, et al., "A New Adaptive Image Contrast Enhancement Method," *SPIE* vol. 1903, 1993; 103–110.

W. Duch, et al., "Bi–Radial Transfer Functions," *Proceedings of the Second Conference on Neural Networks and Their Applications,* May 1996; 131–137.

W. Duch, et al., "Bi–Radial Transfer Functions," *Technical report UMK–KMK–TR* 1/96, 1995 (in Polish).

A. V. Isaev, "Zakon Razpredeleniya Bogatsva (The Law of the Distribution of Wealth)," *LISS Pub. Co.,* Ch. 1, Equation 1, 1998; 1–3, 14–15.

A. A. Hamie, et al., "The British Building Colour Standards: Conversion to the Notations of munsell, NCS, DIN, Coloroid, Colorcurve, and OSA–UCS," *Color Res. And Appl.,* vol. 20(5) Oct. 1995; 328–340.

P. Hung, et al., "Determination of Constant Hue Loci for a CRT Gamut and Their Predicitons Using color Appearance Spaces," *Color Res. And Appl.,* vol. 20(5) Oct. 1995: 285–295.

\* cited by examiner

AUTOMATIC CONTRAST ENHANCEMENT

BACKGROUND OF THE INVENTION

1. Field of the Invention

The present invention relates to the field of imaging, the field of computer assisted imaging, the field of digital imaging, and the field of automatically controlled enhancement of specific attributes of digital imaging data such as contrast.

2. Background of the Art

Except perhaps in the case of artistic effects, it is desirable that images, including digital images, reveal all the detail in a scene without creating an unnatural look. Faithful replication is an important goal for the capability of any imaging system. Contrast enhancement has, therefore, been an important objective in the image processing art. Automatic contrast adjustment has been a particularly sought after, but elusive objective. The concept of contrast in imaging technology is a broad term, especially when discussed in more than purely technical terms. Fundamentally, contrast concerns the visibility of detail in the image, or the ability of one detail or difference in an image to be visually differentiation from another detail. One view of contrast is in terms of the increment of brightness that can be discerned against a background of given brightness. This phenomenon can be seen in both a local and a global sense.

The edge of an object in an image is a local feature. When the difference in brightness across such an edge is increased, the local contrast is raised and the image is usually perceived as sharper. There is a whole spectrum of algorithms in image processing that concerns local contrast enhancement, ranging from sharpening filters such as those discussed in John. C. Russ, "The Image Processing Handbook", 2nd Edition, CRC Press, Boca Raton, Fla., 1995 to algorithms that manipulate brightness within regions of images such as those described in S. M. Pizer, J. D. Austin, R. Cromartie, A. Geselowitz, B. ter Haar Romeny, J. B. Zimmerman and K. Zuiderveld, "Algorithms for adaptive histogram equalization", Proc. SPIE, 671, 132 (1986). Some more recent examples of the latter include J. A. Stark and W. J. Fitzgerald, "An alternative algorithm for adaptive histogram equalization", Graphical Models and Image Processing, 58, 180 (1996) or U.S. Pat. No. 6,148,103 concerning a method for improving contrast in picture sequences. U.S. Pat. No. 5,581,370 discloses a method of improving the contrast of a natural scene that makes use of local image histograms and U.S. Pat. No. 5,426,517 describes automated tone correction using filtered histogram equalization. In Y. -T. Kim, "Mean based bi-histogram equalization: a novel extension of histogram equalization preserving brightness", Proc. IASTED International Conf. Signal and Image Processing (SIP '96), 310 (1996), the importance of keeping the mean brightness of the image unchanged during local manipulation of contrast is emphasized. The results of manipulating local contrast depend on the specific spatial pattern of brightness in the image.

The global view of image contrast is based on the observation that, in very dark or very light image areas, the human eye can discern only relatively large brightness differences, while smaller differences can be distinguished at intermediate brightness levels. This is discussed, for instance, in Chapter 2 of W. K. Pratt, "Digital Image Processing", Vol. 1, Wiley, N.Y. (1978). As a result, a change in the distribution of brightness in an image can hide or reveal detail. It is well know to apply such changes manually using a power law transformation such as that found, for instance, in the "Gamma Correction" function of Paint Shop Pro 7 (Jasc Software, Inc., 7095 Fuller Road, Eden Prairie, Minn., 55344). The distribution of brightness is characterized by a histogram, which is a graph that represents the frequency of occurrence of specific brightness levels within an image. Note that because the graph is a frequency distribution rather than a positional distribution, if the location of image pixels is randomly permuted in the image, the histogram does not change. Thus, global contrast manipulations that modify the distribution of brightness are not influenced by the specific spatial pattern of brightness in the image. This has led to difficulties in applying optimal global contrast adjustment to images in an automated fashion. The present invention is concerned with such global adjustment.

Among the methods for modifying the global contrast of images are those based on histogram equalization. Histogram equalization maintains the brightness ranking of image pixels but redistributes the brightness values so that an equal number of pixels have each possible brightness value. This, however, can lead to a nighttime scene being rendered or converted to a daytime scene. Other methods of histogram adjustment described in R. Humel, "Image enhancement by histogram transformation", Comput. Graphics Image Processing, 6, 184 (1977) and W. Frei, "Image enhancement by histogram hyperbolization", Comput. Graphics Image Processing, 6, 286 (1977). A. Mokrane in "A New Image Contrast Enhancement Technique Based on a Contrast Discrimination Model", Graphical Models and Image Processing, 54, 171 (1992) discusses a brightness transformation based on a mathematical model that follows a power law. U.S. Pat. No. 5,265,200 discloses a method of fitting weighted second order functions to a gray scale level histogram by linear regression and using one of the fitted functions to modify the image. Another approach to global contrast manipulation involves specifying the desired form of the histogram. Examples of such approaches include V. F. Nesteruk, "Optimum nonlinear contrast statistical image converter and an evaluation of its efficiency", Soviet J. Optical Technology, 48, 647 (1981) and V. F. Nesteruk and N. N. Porfiryeva, "Contrast law of light perception", Optics and Spectroscopy, 29, 606 (1970). None of these global correction methods, however, give fully satisfactory results, especially with regard to reliably acceptable enhancement.

Additional art of relevance to global histogram adjustment includes the following. Japanese Pat. 9-149277 (Application No. JP 95301703) describes a method of adjusting the lightness of an image on the basis of the histogram maximum. Japanese Pat. 5-176220 (Application No. JP 91343518) concerns an automatic exposure control for a camera using fuzzy reasoning, which estimates mean image brightness and controls exposure based on the number of pixels having a brightness lower than the mean. U.S. Pat. No. 5,883,984 describes a hardware method of contrast adjustment using I in the HSI color space and the mean and median values of the RGB color channels. U.S. Pat. No. 5,396,300 discloses a contrast correction device for video signals using a circuit to determine if the image is bright or dark and a second circuit to apply a gamma correction. U.S. Pat. No. 5,926,562 teaches a method of exposure compensation by selecting a gamma correction on the basis of at least one of a reference minimum value, a reference maximum value and the average value of the brightness of an image. U.S. Pat. No. 5,812,286 discloses a method of color and contrast correction based on the minimum, median and maximum values of each color channel, along with a user-supplied parameter. U.S. Pat. No. 5,414,538 describes a method of contrast correction in which bounds of a brightness histogram are compared to thresholds and, if the thresholds are exceeded, the bounds and thresholds are used to form a gamma correction for the brightness. U.S. Pat. No. 5,712,930 teaches the selection of a gamma correction function from among several such functions by means of a neural network. U.S. Pat. No. 4,731,671 discusses a method where image contrast is automatically determined as a function of the standard deviation of a sample of tone values that is selected from a plurality of samples corresponding to a plurality of contrast intervals based on the shape of the histogram. In U.S. Pat. No. 4,654,722 is described a related procedure based normalizing a histogram of a sample of tone values selected from an image dependent "floating" contrast interval. U.S. Pat. No. 5,937,090 discloses a image enhancement method using quantized histogram equalization, which retains the mean input brightness as the mean output brightness. Though this is a local correction method, the disclosure also contemplates adding an offset to very low mean brightness values and subtracting an offset from very high mean brightness values. U.S. Pat. No. 5,450,502 teaches forming a global histogram of intensity and operating on it with a filter that flattens peaks and valleys, though the claims also require calculation of local histograms. U.S. Pat. No. 5,347,374 describes cascaded histogram processing, wherein a histogram is modified with a tone reproduction curve and smoothed in a first image processing module and then directed to a second processing module in which a second tone reproduction curve further modifies the histogram. Finally, the following paper describes lightness modification with a sigmoidal transfer curve: G. J. Braun and M. D. Fairchild, "Image lightness rescaling using sigmoidal contrast enhancement functions", *J. Electronic Imaging*, 8, 380 (1999). No mathematical form for any sigmoidal function is given and it is most probable that the transformation was effected by means of an interpolation (such as a spline) through a series of hand-crafted, and therefore not dynamically adjustable, points. Further, this paper is concerned with mapping from the color gamut of one device to another rather than with image enhancement.

SUMMARY OF THE INVENTION

It is an aspect of this invention to provide a method of global contrast enhancement for digital images. Another aspect of the invention is to provide an automatic method of global contrast enhancement for digital images. A further aspect of the invention is to provide a means of contrast enhancement in an image by gamma correction, wherein the exponent is derived from a brightness-dependent shift applied to a measure of central tendency of the brightness histogram.

Another aspect of the invention is to provide a means of optimizing midtone contrast in an image by modifying image brightness using an S-shaped function that does not alter a measure of central tendency of the brightness histogram. A still further aspect of the invention is to automatically enhance the global contrast of a digital image using a combination of gamma adjustment and an S-shaped transformation.

DETAILED DESCRIPTION OF THE INVENTION

Figure 1:
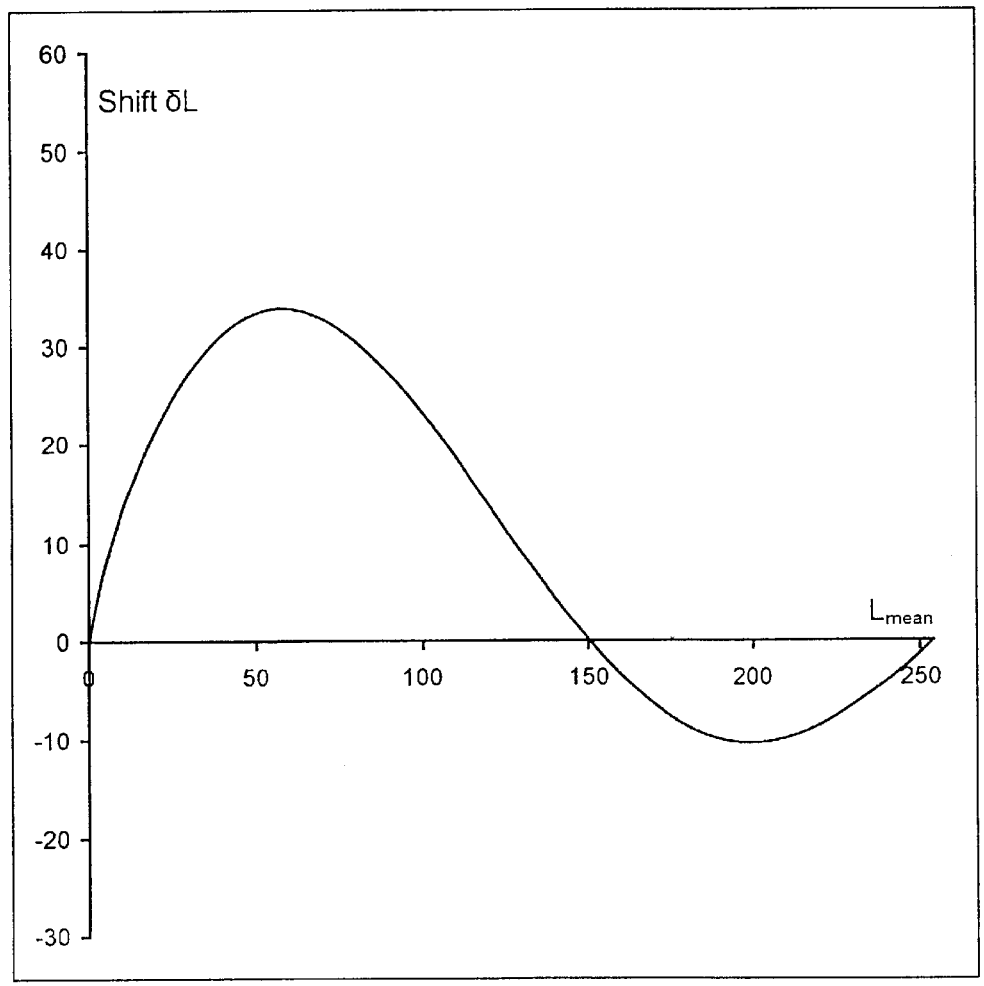
FIG. 1 shows a graph of the dependence of the shift on the initial mean brightness.

This invention relates to software and hardware operations that operate on digital images. A digital image comprises a collection of picture elements or pixels arranged on a regular grid. A gray scale image is represented by a channel of specific brightness values at individual pixel locations. Such a channel may also be represented as a color palette, for example, a palette containing 256 shades of gray. Gray scale images contain only achromatic colors, in other words those images without a specific hue and with a zero saturation. A color image contains several channels, usual three or four, to describe the color at a pixel. For example, there may be red, green and blue (RGB) channels, or cyan, magenta, yellow and black (CMYK) channels. Each channel again contains brightness values representing the amount of color at each pixel. A color image may also be represented in palettized form. Such images contain chromatic colors, which possess both hue and saturation. The invention is concerned with automatic adjustment of the contrast of both gray scale and color images. In the case of gray scale images, the channel represents brightness directly and can be used for contrast adjustment. However, in color images, the channels represent the human sensation of brightness or lightness only indirectly, so the color information must be transformed to a quantity representative of brightness prior to adjustment.

Three-dimensional color spaces that have one dimension substantially representing human lightness perception are well known in the art. Such spaces typically have a chrominance plane orthogonal to the lightness dimension, which plane represents the chromatic component of color. Different directions from the lightness axis within the chrominance plane correspond to different color hues and distance from the lightness axis, at least approximately, is related to the perceived saturation or vividness of the color. Such a color space may be represented in polar coordinates in which rotation about the lightness axis represents a hue angle or color phase, and distance from the hue axis represents saturation. The lightness axis may also be rendered as intensity, brightness, luminance, value or luma without material effect on the invention.

The color space used for adjusting contrast may be a perceptual color space. The small color differences of the same perceptual size are represented by approximately the same numerical distance or proportional distances in the color space. Examples of such color spaces are color difference systems such as the CIE L*u*v* and CIE L*a*b* color spaces as described in G. Wyszecki and W. S. Stiles, "Color Science—Concepts and Methods, Quantitative Data and Formulae", Wiley, N.Y., 1982. Other color suitable color spaces are color appearance systems such as those described in M. D. Fairchild, "Color Appearance Models", Prentice-Hall, New York, 1998. Examples include: the Nayatani color model (Y. Nayatani, *Color Res. and Appl.*, 20, 143 (1995)); the Hunt color model (R. W. G. Hunt, *Color Res. and Appl.*, 19, 23 (1994)); the LLAB color model (R. Luo, *Proc. SPIE*, 2658, 261 (1996)); the RLAB model (M. D. Fairchild, *Color Res. and Appl.*, 21, 338 (1996)); the ZLAB model (M. D. Fairchild, *Proceedings of the CIE Expert Symposium '97 on Colour Standards for Image Technology*, CIE Pub. x014, 89–94 (1998)); the IPT model (F. Ebner.and M. D. Fairchild, *Proc. 6th IS&T/SID Color Imaging Conf.*, 8 (1998)); the ATD model (S. L. Guth, *Proc. SPIE*, 2414, 12 (1995)); the Granger adaptation of ATD as disclosed in U.S. Pat. No. 6,005,968; and the CIECAM97s model described in *CIE Pub.* 131 (1998). Additional useful color spaces include those that take spatial variation of color into account, such as S-CIELAB (X. Zhang and B. A. Wandell, *J. Soc. Information Display*, 5, 61 (1997)).

Color order systems are color spaces in which colors are arranged according to constant perceptual difference. Such color spaces may also be used for the practice of this invention. Examples of such color order systems include: the Munsell system (R. S. Berns and F. W. Billmeyer, *Color Res. and Appl.*, 21, 163 (1996)); the Optical Society of America Uniform Color Scale (D. L. MacAdam, *J. Opt. Soc. Am.*, 64, 1691 (1974)); the Swedish Natural Color System (*Swedish Standard SS* 0191 02 Color Atlas, Second Ed., Swedish Standards Institution, Stockholm, 1989); http://www.ncscolour.com/); and the Deutches Institut für Normung system (M. Richter and K. Witt, *Color Res. and Appl.*, 11, 138 (1984)). However, because these spaces tend to be defined by color samples rather than by numerical transformation they are less desirable for the practice of the invention.

Other color spaces may also be employed, for example those used in television color standards, such as YIQ or YUV, or YCbCr, the Xerox YES space, the Kodak Photo YCC space, the Tektronix HVC (hue-value-chroma) color space, the HSV (hue-saturation-value) color space described by A. R. Smith, *Comput. Graph.*, 12, 12 (1978) and Lsα color space mentioned in WO 97/01151. Various computer graphics color spaces such as HLS (hue-lightness-saturation), HSL (hue-saturation-lightness), HSI (hue-saturation-intensity) or HSB (hue-saturation-brightness) may also be used. These spaces are described in J. Foley, A. van Dam, S. Feiner and J. Hughes, "Computer Graphics: Principles and Practice", Second Edition in C, Addison-Wesley, Reading, Mass., 1995. Since the computer color spaces tend to accord less well with human perception they are less desirable for the practice of the invention.

Color spaces such as the CIE L*u*v* and CIE L*a*b* color spaces are preferred for the invention since L* offers a good perceptual representation of lightness without the complexities inherent in color appearance spaces. Especially preferred are color spaces such as YIQ, YUV, YCbCr, YES, YCC, HVC and HSV because they offer a sufficiently perceptual representation of brightness accompanied by simple color space transformation. Of these, YIQ and YUV are especially preferred and contrast adjustment makes use of the luminance, Y. Contrast correction of a color image may start with conversion to such a color space.

One aspect of the present invention may be considered to be practiced according to the steps of:
 a. Choosing some measure of central tendency (MCT) of the histogram
 b. Using the MCT to establish a shift that will notionally be applied to the MCT itself
 c. Computing that gamma that produces the above required shift in the MCT
 d. Using that gamma to modify every brightness value in the histogram. A brightness value corresponding to the MCT may or may not exist in the histogram (e.g., an image with equal amounts of black and white will have a mean of gray, which color is not in the image). Thus, we don't move the MCT as such. Instead we move (potentially) all values in the histogram in such a way that the MCT computed after the move is where we want it to be (i.e., the position of the old MCT plus the desired shift). The word "potentially" is used, for instance, because in some cases quantization (i.e., rounding or truncation) to integer units could result in a particular brightness value remaining unchanged, and because values at the limits of the brightness range do not change. Modifying the image the image using a gamma tone reproduction curve, which results in a histogram modified as desired.

In a less mathematical or less technical description of the invention, the invention may be described as a method of automatic contrast correction comprising providing digital image data, representing the data in the form of a brightness histogram, determining a measure of central tendency (MCT) of the histogram, adding a shift to the MCT to provide an adjusted MCT, using the original and adjusted MCT to determine the exponent of a non-linear histogram transformation, and applying the transformation to all brightness values in the image. The non-linear transformation would convert the brightness histogram in such a way that it would have approximately the adjusted MCT after transformation. The method may determine the exponent by using the initial MCT of the histogram for the digital image data (represented by $L_{MCT}$), the adjusted MCT according to a shift of the initial MCT (represented by $L'_{MCT}$), the largest possible brightness value in the digital image data (represented by N), where the exponent is represented by γ according to the relationship:

$$\gamma = ln(L_{MCT}/N)/ln(L'_{MCT}/N)$$

The method may have the shift value vary as a function of the initial measure of central tendency of the histogram, for instance as represented by the initial mean brightness. For example, the shift value may be zero for a mean brightness of zero and increase to a maximum with increasing mean brightness before falling to zero at an intermediate mean brightness, and as mean brightness increases beyond the intermediate mean brightness, the shift value decreases falls to a negative, minimum value before increasing to zero again at the maximum mean brightness that the image can have. The method may apply to the image brightness, in combination with the above described process, an S-shaped transformation that does not change a measure of central tendency of the brightness histogram; or, the method may be practiced separately, such as by a method of automatic contrast correction comprising providing digital image data, representing the data in the form of a brightness histogram, determining a measure of central tendency of the brightness histogram and then applying an S-shaped transformation to the image brightness that does not change the measure of central tendency of the brightness histogram but shifts at least some brightness values above the central tendency of the brightness histogram and/or below the central tendency of histogram brightness. The shift associated with the S-shaped transformation may, for example, be a positive shift below the invariant measure of central tendency of the histogram and a negative shift above this measure. Alternatively, the shift caused by the S-shaped transformation may be a negative shift below the invariant measure of central tendency of the histogram and a positive shift above this measure. A convenient step is to have the measure of central tendency be the mean brightness. The S-shaped transformation or curve may have the form of a tilde function. The program may be implemented automatically or manually, with an operator of a computer selecting the shift value in performing the method.

The invention may be practiced by a computer performing the method of the invention. For example, the invention may be practiced with a computer having software executable therein that enables contrast correction comprising providing digital image data, representing the data in the form of a brightness histogram, determining a measure of central tendency (MCT) of the histogram, adding a shift to the MCT to provide an adjusted MCT, using the original and adjusted MCT to determine the exponent of a non-linear histogram transformation, and applying the transformation to all brightness values in the image. Also, the computer may execute a process that enables contrast correction comprising adjusting digital image data by representing the data in the form of a contrast histogram, determining a measure of central tendency of histogram brightness and then applying to the image brightness an S-shaped transformation that does not change a measure of central tendency of the brightness histogram but that changes at least some brightness values either above or below the measure of central tendency or in both regions.

Prior to any more detailed manipulation of the contrast, it is desirable to ensure that the image uses the entire dynamic range available for brightness representation. For example, an 8-bit representation provides 256 individual intensity or brightness levels, while a 16-bit representation provides 65,536 such levels. If the full dynamic range is not being used, utilization of the full range can be achieved by histogram stretching, a process well known in the art. Examples include the "Auto Levels" feature of Photoshop 4.0 (Adobe Systems Incorporated, 345 Park Avenue, San Jose, Calif. 95110-2704) or the "Auto Tonal Adjustment" in PhotoStyler 2.0. (Aldus Corporation, 411 First Avenue South, Seattle, Wash. 98104). The stretching is a linear transformation of the brightness histogram and may be accomplished in a number of ways. For example, the minimum brightness in the histogram may be equated with the minimum of the brightness range, and the maximum brightness in the histogram may be equated with the maximum of the brightness range. Remaining values of brightness are then constructed by interpolation between these limits. This, however, is not generally an optimal procedure since the results of stretching may be dominated by the properties of a single pixel and so be distorted by image noise or detector saturation. It is, therefore, usual to set the lower limit for stretching as some small fraction of the area under the histogram at the dark end, and the upper limit for stretching as some similar small fraction of the area under the histogram computed from the bright end. This considerably improves the reliability of the histogram expansion to full dynamic range. However, in this process, brightness differences within the small fraction of pixels at the lower end and within the small fraction of pixels at the upper end of the histogram are lost. Usually, when the fraction is small, this is not deleterious. However, it may contribute to some image degradation, for example, in terms of specular reflections from skin areas, which become enlarged and lose detail. Selection of the fraction is, therefore, a compromise between reliability of histogram stretching and quality loss resulting from clipping. A suitable fraction is generally from about 0.001% to about 5%, with a preferred range from about 0.005 to about 0.5%. An especially preferred range is from about 0.01% to about 0.2%. It is also possible to determine the clip limits for histogram stretching by analysis of the histogram as described, for instance, in U.S. Pat. No. 4,999, 711 or in T. -H. Yu and S. K. Mitra, "A new adaptive image contrast method", *Proc. SPIE*, 1903, 103 (1993). After histogram stretching the image is ready for contrast adjustment.

The shape of the histogram can be represented by a statistical measure of central tendency. Examples of such measures include the median, the mode, the arithmetic mean, the geometric mean, the harmonic mean, the quadratic mean and the like. Though all can be used, the arithmetic mean is preferred for its robustness and ease of calculation. The subsequent description will be couched in terms of the arithmetic mean but it will be understood that other measures of central tendency may replace it within the practice of the present invention without altering the basic concept and practice of this invention.

It has been found that very satisfactory improvements in contrast can be obtained when a shift, $\delta L$, is added to the mean of the original histogram, $L_{mean}$, to create a new mean value $L'_{mean}$ according to:

$$L'_{mean} = L_{mean} + \delta L$$

provided the shift is chosen appropriately. From the new value of the mean it is possible to compute an exponent, $\gamma$, for gamma correction by means of the equation:

$$\gamma = ln(L_{mean}/N)/ln(L'_{mean}/N)$$

where N is the largest possible brightness value, for example 255 in the case of an 8-bit brightness representation. Once the gamma value is available, any original brightness $L_i$ may be converted to a new enhanced brightness $L'_i$ by means of gamma correction so that:

$$L'_i = N(L_i/N)^{1/\gamma}$$

Thus the shift, $\delta L$, determines the transformation exponent, $\gamma$, and the transformation determines the relationship between initial brightness values and the new brightness values that serve to improve the image contrast. The process of gamma correction optimizes the balance between shadows and highlights to reveal the best level of detail in these image areas.

The method of determining the shift, $\delta L$, is an important element of one aspect of the invention. The shift varies as a function of the initial mean brightness. The shift is zero for a mean brightness of zero and increases to a maximum with increasing mean brightness before falling to zero at intermediate mean brightness. As mean brightness increases further, the shift falls to a negative, minimum value before increasing to zero again at the maximum mean brightness that the image can have. This dependence of the shift on the initial mean brightness is illustrated in FIG. 1.

The variation of the shift may also be represented by the following equation:

$$\delta L = q(L_{mean}/N)^r(1-[L_{mean}/N])^s$$
$$([t-L_{mean}]/N)^u \exp(v[L_{mean}/N]^w) \exp\{x([y-L_{mean}]/N)^z\}$$

where q, r, s, t, u, v, w, x, y and z are constants. In the particular case of luminance Y from the YIQ color space represented using 8-bits and clip limits of 0.03%, the values of the constants are:

$$N = 255$$
$$q = 480$$
$$r = 0.8$$

-continued $s = 1$ $t = 150$ $u = 1$ $v = -0.7$ $w = 2$ $x = -1.2$ $y = 150$ $z = 2$ Naturally, if a different measure of brightness were used or a different measure of the histogram central tendency were selected these constants would change. Nonetheless, the overall form of the dependence of the shift on mean brightness would remain unchanged. This form can be termed a "normal" correction without any bias.

Figure 2:
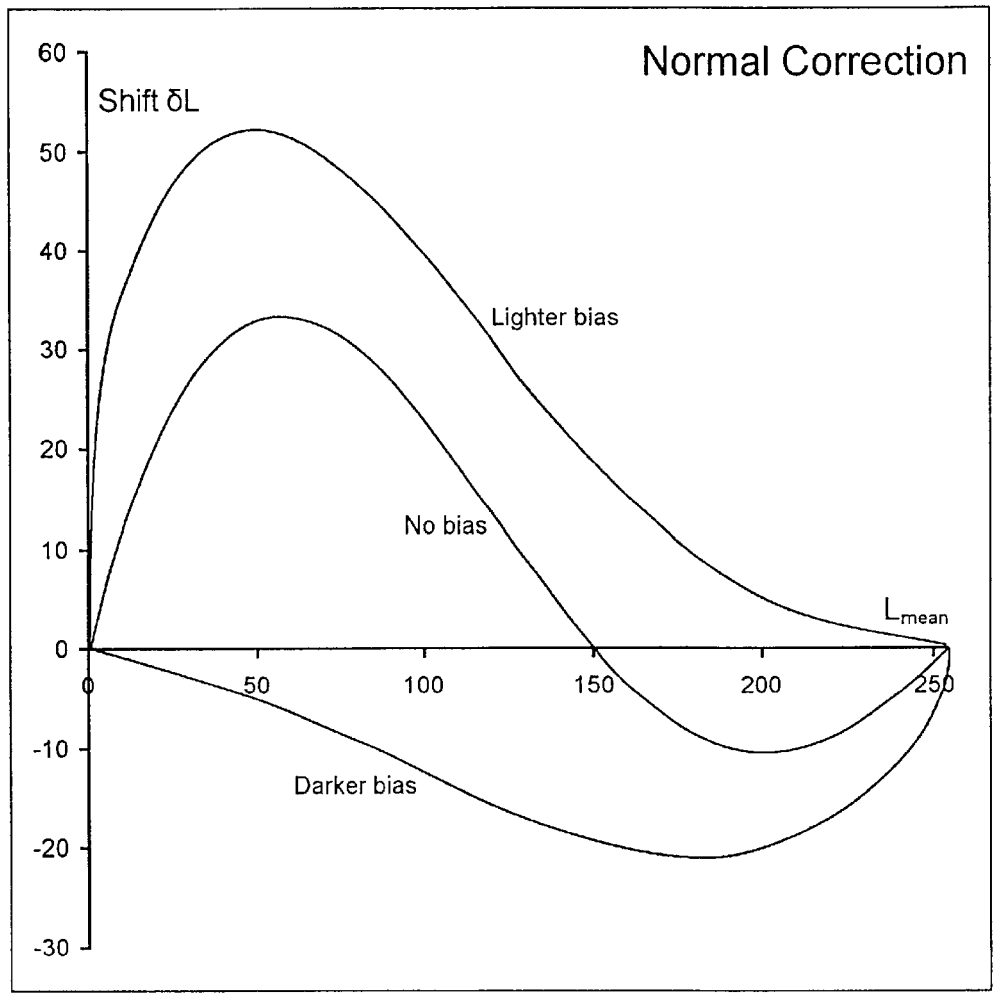
FIG. 2 shows dependencies of the shift for the case of "normal" correction without bias or with "lighter" or "darker" bias.
Figure 3:
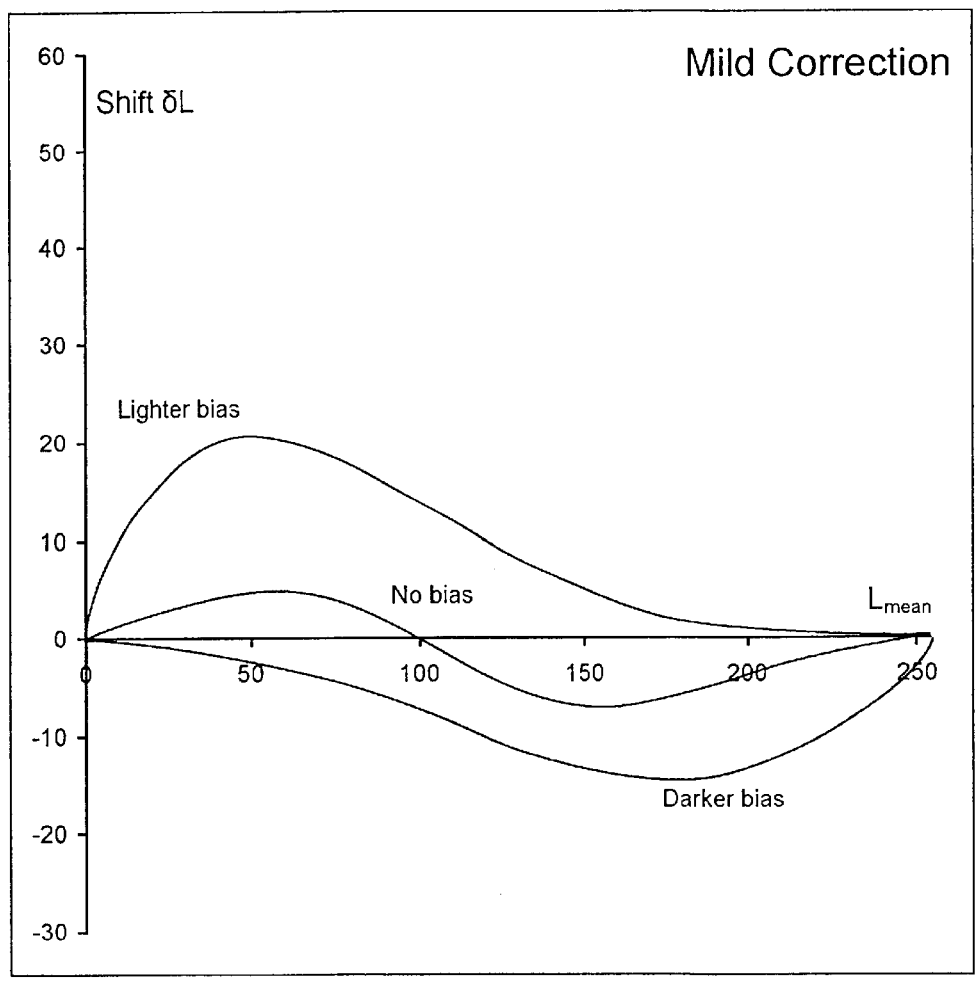
FIG. 3 shows bias variations for "mild" correction.

While the results obtained with the shift dependence described above are very satisfactory, it is also possible to alter the form of the variation of the shift with mean brightness from the "normal" correction. One reason for doing so is to allow for different tastes among people in preferred contrast. In such a case it is particularly advantageous to provide an additional choice of shift wherein all shifts are smaller in size. This may be termed a "mild" correction. Another reason for modifying the shift dependence is to allow for so-called subject failure. This occurs, for example, when the main subject of the image is dark because of backlighting or because reflections from the sand on a beach or from snow cause erroneous exposure in the camera. Reflections of a camera flash in mirrors and windows can cause similar exposure errors. An excessively bright subject can result when the subject is much closer to a camera flash than any other object in the scene. To cope with such subject failure, it is advantageous to provide a set of shifts biased towards brightening images and another biased towards darkening images. These can be termed "lighter" and "darker" bias respectively. Suitable dependencies of the shift for the case of "normal" correction without bias or with "lighter" or "darker" bias are shown in FIG. 2. The corresponding bias variations for "mild" correction are shown in FIG. 3. In the particular case of luminance Y from the YIQ color space represented using 8-bits and clip limits of 0.03%, specific examples of values of the constants for the shift equation are given in the following table. The values shown are merely representative of specific values selected by an operator on the basis of results intended in the contrast correction. The operator may select a range of values for each component according to the teachings of the present invention. Alternatively these values may serve as a non-limiting representation of values that may be preset within internal data structures of the program or software.

| Correction: | Normal | | | Mild | | |
|---|---|---|---|---|---|---|
| Bias: | Lighter | None | Darker | Lighter | None | Darker |
| N | 255 | 255 | 255 | 255 | 255 | 255 |
| q | 145 | 480 | -75 | 62 | 15000 | -80 |
| r | 0.3 | 0.8 | 0.4 | 0.7 | 0.8 | 0.1 |
| s | 0.5 | 1 | 0.5 | 0.2 | 1.2 | 0.6 |
| t | 1 | 150 | 1 | 1 | 100 | 1 |

| Correction: | Normal | | | Mild | | |
|---|---|---|---|---|---|---|
| Bias: | Lighter | None | Darker | Lighter | None | Darker |
| u | 0 | 1 | 0 | 0 | 3 | 0 |
| v | -4.0 | -0.7 | -0.5 | -6.0 | -4.1 | -1.0 |
| w | 2 | 2 | 2 | 2 | 2 | 2 |
| x | -0.4 | -1.2 | -3.0 | -0.5 | -2.0 | -5.0 |
| y | 255 | 150 | 255 | 255 | 255 | 255 |
| z | 2 | 2 | 2 | 2 | 2 | 2 |

The aforementioned shifts provide a method of automatically adjusting global contrast in terms of balance between shadows and highlights. Variations on the basic shift dependence also provide for optional manual fine tuning either to accommodate different tastes or subject failure. However, further improvement in the image contrast can be provided by automatically adjusting the balance of midtones on the one hand with shadows and highlights on the other. A range of automatic contrast controls may be provided by providing a portfolio or list of varying collections of values.

A narrow perspective of the process of the invention may be practiced with the following steps:
1. We first use an S-shaped transformation
2. This transformation is represented as a pair of curves ("left-to-right" and "down-to-up" in shorthand)
3. It is the properties of the curves that are described, not the properties of the functions from which they are built. As an example, we may mention functions from which the requisite curves may be assembled. Conceptually, these fall (we believe) into three classes:
   a) A single function that is capable of representing both curves in the pair and anything in between. This is represented, for instance, by the tilde function
   b) A pair of functions, such as a trigonometric function and its inverse.
   c) More than two functions. Here essentially any shape can be approximated by means of a curve defined by (as many as necessary) piecewise functions. For example, many pieces of different cubic functions can be put together (conditional on the derivative being continuous at the joins) into a single smooth curve—something that is just the well-know spline.

Figure 4:
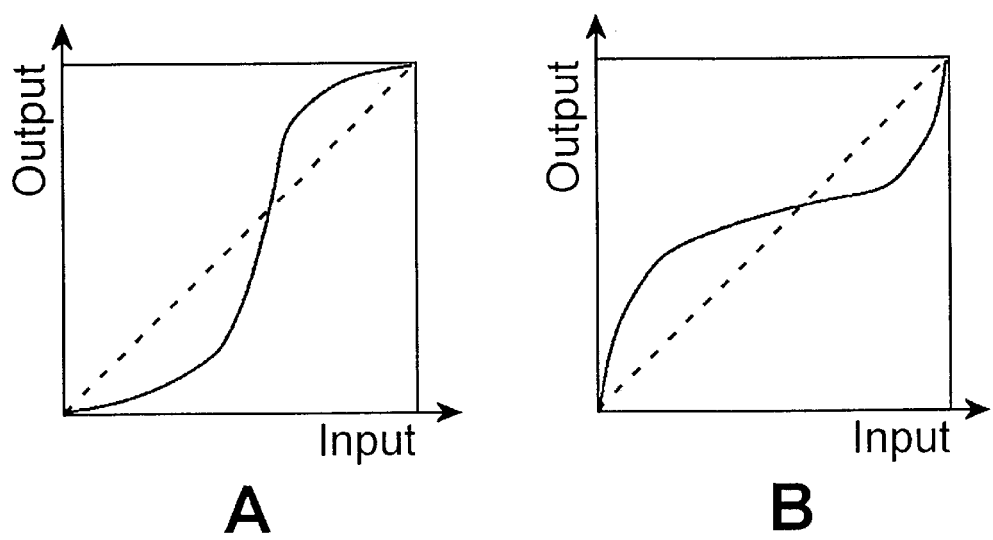
FIGS. 4A and 4B show S-shaped transformation involving a tone reproduction curve with shapes such as shown in 4A and 4B.

This balancing of midtones is achieved by either compressing or expanding the midtones in an automated fashion by means of an S-shaped transformation relating input brightness to output brightness. This may be a transformation applied directly to an image without preceding adjustments, as discussed below, or preferably the transformation is applied following adjustment of the brightness using the shift-based gamma modification and occurs without further change of the mean brightness. In the context of this invention, an S-shaped transformation involves a tone reproduction curve with a shape such as shown by the solid line in FIG. 4A and a required associated counterpart tone reproduction curve with shape as shown by the solid line in FIG. 4B. The dashed lines in the Figures are provided for reference and represent a tone reproduction curve that does not alter any image brightness. In the central region of FIG. 4A to the left of the intersection of dashed and solid line the curve lowers output brightness and to the right of the intersection it raises output brightness. Conversely, in the central region of FIG. 4B to the left of the intersection of dashed and solid line the curve raises output brightness and to the right of the intersection it lowers output brightness. An alternative description of the curve of FIG. 4A is that, for a range of input brightness values of interest, the curve is monotonic and non-decreasing for increasing input brightness values. With increasing input in this interval, the slope of the curve increases to a maximum at a point of inflection and then decreases. This is true irrespective of whether the curve is constructed from a single function (for example a sigmoidal function) or by piecewise combination of separate functions. The counterpart curve of FIG. 4B is, for a range of input brightness values of interest, monotonic and non-decreasing for increasing input brightness values. With increasing input brightness in this interval, the slope of the curve decreases to a minimum at a point of inflection and then increases, no matter how the shape of the curve is achieved. In fact, the curves comprising the S-shaped transformation may be constructed in a number of ways and any convenient or known way may be chosen within the scope of the invention. Thus, for example, if the shape of the curve of FIG. 4B is represented by a sigmoidal function y=f(x) the counterpart shape may be achieved with a second function y=g(x), where g(x) is the inverse of f(x). For example, if the shape in FIG. 4A is represented by the sigmoidal function:

$$y = \arctan(x)$$

then the shape in FIG. 4B can be represented by the inverse function:

$$y = \tan(x)$$

Examples of suitable sigmoidal functions include the arctangent function and the hyperbolic tangent function. Other additional examples may be found, for instance, in W. Duch and N. Jankowski, "Bi-radial transfer functions", in *Proceedings of the Second Conference on Neural Networks and Their Applications*, Szczyrk, Poland, May 1996, 131 and W. Duch and N. Jankowski, "Bi-radial transfer functions", *Technical Report* UMK-KMK-TR 1/96, Department of Computer Methods, Nicholas Copernicus University, Toru, Poland, 1995. A second exemplary way of constructing the curves of the S-shaped transformation is in piecewise form. For example, the curve may be formed by linear interpolation between points lying on a curve such as that of FIG. 4A and of FIG. 4B or preferably as a smooth curve passing through such points as, for instance, a spline curve. A third exemplary way of constructing the curves of S-shaped transformation, and the preferred way, is by means of a single mathematical function that, by means of a change in parameters or constants, may be transformed from a shape like that of FIG. 4A to one like that of FIG. 4B. An especially preferred function is the so-called tilde function, T(x), described in A. V. Isaev, "Zakon Razpredeleniya Bogatsva" ("The Law of the Distribution of Wealth"), "LISS" Publishing Company, St. Petersburg, Russia, 1998, Chapter 1, Equation 1, which takes the general form:

$$T(x) = a \exp\{-b[\ln(c/x)]^d\}$$

where a, b, c and d are constants. For values of d greater than 1, this function has the shape in FIG. 4A, while for d less than 1 the shape is that in FIG. 4B.

Using the specific example of the tilde function, new values of brightness, $L''_i$, are constructed from the shift-corrected values, $L'_i$, using the equation:

$$L''_i = N \exp\{-b[\ln(N/L'_i)]^d\}$$

where the parameters b and d are determined by the constraint that the mean brightness does not change (i.e. that $L''_{mean} = L'_{mean}$). This condition means that b and d are related by the equation:

$$b[\ln(N/L'_{mean})]^{1-d}$$

In turn, d may be determined by regression analysis of a fit of the tilde function to the integral histogram.

One specific method of determining d is the following. An integral histogram of brightness values, $H(L_i)$, is formed as a cumulative sum of the normal histogram values. A limited portion of the integral histogram ranging from 10% to 90% of the brightness values found in the image is then considered. Thus the lower bound of the interval is $H_{10\%}$ at a brightness $L_{10\%}$ and the upper bound is at $H_{90\%}$ at a brightness of $L_{90\%}$. The tilde function equation is, therefore:

$$H(L_i) = (H_{90\%} - H_{10\%}) \exp(-b\{\ln[(L_{90\%} - L_{10\%})/(L_i - L_{10\%})]\}^d)$$

which may be transformed by taking natural logarithms to the linear regression equation:

$$\ln\{\ln[H(L_i)/(H_{90\%} - H_{10\%})]\} = d \ln\{\ln[(L_{90\%} - L_{10\%})/(L_i - L_{10\%})]\} + \ln b$$

of which the slope gives d. A corresponding value of b may be determined from the earlier equation for b derived under the requirement that mean brightness remains unaltered. While it is possible to use directly the values of b and d determined by this procedure, in view of the wide variation in histogram shapes more reliable results can be obtained by introducing additional constraints. For example, it is preferred to restrict d to certain specific values, for example values between 0.2 to 2.0, such as about 0.8, 1.0, 1.1 and 1.2. In the specific case of brightness expressed as the luminance, Y, in the YIQ color space the following logic may be used:

If $(L_{10\%} > 0.15N$ and $L_{90\%} < 0.85N)$ or $(L_{10\%} > 0.25N)$ then d=1.2

If d 1 and $[(L_{10\%} > 0.04N$ and $L_{90\%} < 0.85N)$ or $(L_{10\%} > 0.15N$ and $L_{90\%} < 0.96)]$then d=1.1

If d<1 then d=0.8

Otherwise d=1.0

Once d is determined in this way, b is derived from the condition that $L'_{mean}$ does not change. Subsequently values of $L''_i$ are formed as described above.

If desired, it is possible to provide optional variation of the midtone manipulation to cater to the tastes of different people. One way to do this, for instance, is to provide settings that give a flatter appearance or one with more contrast than the default. The former can be achieved, for instance, by reducing the selected value of d by about 0.2, while the latter can be obtained by raising d by about 0.2 or by another increment of comparable size. It is also possible to assume—for example because of the source—that the initial contrast of the image is well balanced between shadows and highlights. In such a case the gamma correction derived from the shift becomes unnecessary and only midtone adjustment is done.

Balancing of highlights and shadows is accomplished using a gamma correction based on the shift of a measure of central tendency of the histogram. This results in construction of a look-up table for converting initial brightness values, $L_i$, to corrected ones, $L'_i$. Subsequently, midtones are balanced against highlights and shadows using the previously defined S-shaped function. This leads to a look-up table for converting the intermediate values, $L'_i$, into the final values, $L''_i$. The image may be converted from the initial to the contrast enhanced version by successive application of the two look-up tables. However, it is preferred that the two tables be combined into one table so that only a single transformation is performed on the image.

In the practice of this invention the shapes of the tone reproduction curves are determined in a novel fashion, which depends on establishing a desired shift of a measure of central tendency of the image histogram. This shift is derived from shift curves that are also unique features of the practice of the invention. In practicing these methods, curves are produced wherein the shape of the shift curve may be selected from the group consisting of:

a) a curve with two distinct, but contiguous sections, a first section having a positive integration value (that is a mathematical integration of the area under the curve provides a positive number, as shown in the lighter bias curve in FIG. 2 and with lower contrast values in the normal bias curve in FIG. 2) and a second section having a negative integration value (that is a mathematical integration of the area under the curve provides a negative number, as shown in the darker bias curve in FIG. 2 and with higher contrast values in the normal bias curve in FIG. 2);

b) a curve with only positive integration values under the curve; and c) a curve with only negative integration values under the curve.

The shape may also be described as a curve that has positive integration values in relatively lower brightness areas of the histogram and negative integration values in relatively higher brightness areas of the histogram.

What is claimed is:

1. A method of automatic contrast correction comprising providing digital image data, representing the data in the form of a brightness histogram, determining a measure of central tendency for said histogram as a determined measure of central tendency, adding a shift value to the measure of central tendency to provide an adjusted measure of central tendency, computing a tone reproduction curve by a ratio containing logarithms of determined and adjusted measures of central tendency, and applying this tone reproduction curve to brightness values of the image.

2. The method of claim 1 wherein computing the exponent of a tone reproduction curve, $\gamma$, is performed by the equation.

$$\gamma = ln(L_{orig}/N)/ln(L_{adj}/N)$$

where $L_{orig}$ represents the determined measure of central tendency, $L_{adj}$ the adjusted measure of central tendency, and N the maximum image brightness.

3. The method of claim 1 wherein computing the exponent of a tone reproduction curve, $\gamma$, is performed by the equation.

$$\gamma = (ln\, L_{orig} - ln\, N)/(ln\, L_{adj} - ln\, N)$$

where $L_{orig}$ represents the determined measure of central tendency, $L_{adj}$ the adjusted measure of central tendency, and N the maximum image brightness.

4. The method of claim 1 wherein the shift value is zero for a mean brightness of zero and increases to a maximum with increasing mean brightness before falling to zero at an intermediate mean brightness, and as mean brightness increases beyond the intermediate mean brightness, the shift value decreases, falling to a negative, minimum value before increasing to zero again at the maximum mean brightness that the image can have.

5. The method of claim 1 wherein the tone reproduction curve is given by:

$$L'_i = N(L_i/N)^{1/\gamma}$$

where $L_i$ is any original brightness value, $L'_i$ a corresponding enhanced brightness value, N is the largest possible brightness value, and $\gamma$ is an exponent.

6. The method of claim 5 wherein the measure of central tendency of the brightness histogram is the mean brightness of the histogram, $L_{mean}$.

7. The method of claim 6 wherein the shift is provided by the equation:

$$\delta L = q(L_{mean}/N)^r(1-[L_{mean}/N])^s$$
$$([t-L_{mean}]/N)^u \exp(v[L_{mean}/N]^w)\exp\{x([y-L_{mean}]/N)^z\}$$

where q, r, s, t, u, v, w, x, y and z are adjustable constants.

8. The method of claim 1 wherein the measure of central tendency of the brightness histogram is the mean brightness of the histogram, $L_{mean}$.

9. The method of claim 1 wherein there is also applied an S-shaped tone reproduction curve that does not change a measure of central tendency of the brightness histogram.

10. The method of claim 1 wherein after applying the tone reproduction curve to brightness values of the image, applying to brightness values of the image an S-shaped tone reproduction curve that does not change a measure of central tendency of the brightness histogram.

11. The method of claim 10 wherein a shift value is added to the measure of central tendency to provide an adjusted measure of central tendency, computing the exponent of a tone reproduction curve by means of a ratio containing the logarithms of the determined and adjusted measures of central tendency, and applying to the brightness values of the image a tone reproduction curve derived from the properties of the image.

12. The method of claim 11 wherein the shift value is zero for a mean brightness of zero and increases to a maximum with increasing mean brightness before falling to zero at an intermediate mean brightness, and as mean brightness increases beyond the intermediate mean brightness, the shift value decreases falls to a negative, minimum value before increasing to zero again at the maximum mean brightness that the image can have.

13. The method of claim 11 wherein the tone reproduction curve is given by.

$$L'_i = N(L_i/N)^{1/\gamma}$$

where $L_i$ is any original brightness value, $L'_i$ a corresponding enhanced brightness value, N is the largest possible brightness value, and $\gamma$ is an exponent.

14. The method of claim 13 wherein the measure of central tendency of the brightness histogram is the mean brightness of the histogram, $L_{mean}$.

15. The method of claim 11 wherein the measure of central tendency of the brightness histogram is the mean brightness of the histogram, $L_{mean}$.

16. The method of claim 15 wherein the shift is provided by the equation:

$$\delta L = q(L_{mean}/N)^r(1 - [L_{mean}/N])^s$$
$$([t - L_{mean}]/N)^u \exp(v[L_{mean}/N]^w) \exp\{x([y - L_{mean}]/N)^z\}$$

where q, r, s, t, u, v, w, x, y and z are adjustable constants.

17. The method of claim 11 wherein the contrast adjustment is performed in a color space selected from the group consisting of CIE L*u*v*, CIE L*a*b*, YIQ, YUV, YCbCr, YES, YCC, HVC and HSV.

18. A computer comprising hardware and software that can execute the method of claim 11 from memory in the computer.

19. A computer comprising hardware and software that can execute the method of claim 10 from memory in the computer.

20. The method of claim 1 wherein the contrast adjustment is performed in a color space selected from the group consisting of CIE L*u*v*, CIE L*a*b*, YIQ, YUV, YCbCr, YES, YCC, HVC and HSV.

21. The method of claim 1 wherein the shift is determined from a shift curve.

22. The method of claim 1 wherein the shift is determined from a shift curve with a shape selected from the group consisting of:
  a) a curve with two distinct, but contiguous sections, a first section having a positive integration value and second section having a negative integration value;
  d) a curve with only positive integration values under the curve; and
  e) a curve with only negative integration values under the curve.

23. The method of claim 1 wherein the shift is determined from a shift curve with a shape that has positive integration values in relatively lower brightness areas of the histogram and negative integration values in relatively higher brightness areas of the histogram.

24. A computer comprising hardware and software that can execute the method of claim 1 from memory in the computer.

25. A method of contrast correction comprising providing digital image data, representing the data in the form of a brightness histogram, determining a measure of central tendency for said histogram, and applying to brightness values of the image an S-shaped tone reproduction curve that does not change a measure of central tendency of the brightness histogram.

26. The method of claim 25 wherein the S-shape tone reproduction curve is a tilde function.

27. The method of claim 26 wherein at least one of the parameters of the tilde function is determined by linear regression on the integral brightness histogram.

28. A computer comprising hardware and software that can execute the method of claim 25 from memory in the computer.

29. A method of automatic contrast correction comprising providing digital image data, representing the data in the form of a brightness histogram, determining a measure of central tendency for said histogram, and applying to brightness values of the image an S-shaped tone reproduction curve that does not change a measure of central tendency of the brightness histogram, wherein the shape of the S-shaped tone reproduction curve is determined by linear regression on the integral brightness histogram.

30. The method of claim 29 wherein the S-shape tone reproduction curve is a tilde function.

* * * * *